United States Patent
Lee

(10) Patent No.: US 9,563,321 B2
(45) Date of Patent: Feb. 7, 2017

(54) METHOD FOR DETECTING BACKGROUND SIGNALS OF CAPACITIVE SENSING DEVICE

(71) Applicants: SALT INTERNATIONAL CORP., New Taipei (TW); IMAGINATION BROADWAY LTD., New Taipei (TW)

(72) Inventor: Shang-Li Lee, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 124 days.

(21) Appl. No.: 14/738,798

(22) Filed: Jun. 12, 2015

(65) Prior Publication Data

US 2016/0179286 A1    Jun. 23, 2016

(30) Foreign Application Priority Data

Dec. 17, 2014   (TW) .............................. 103144186 A

(51) Int. Cl.
*G06F 3/041* (2006.01)
*G06F 3/044* (2006.01)

(52) U.S. Cl.
CPC ............. *G06F 3/044* (2013.01); *G06F 3/0416* (2013.01)

(58) Field of Classification Search
CPC ...... G06F 3/0418; G06F 3/044; G06F 3/0416; G06F 3/0488; G09G 5/003; G09G 2300/0426
See application file for complete search history.

(56) References Cited

U.S. PATENT DOCUMENTS

| 2015/0002445 | A1* | 1/2015 | Brunet | G06F 3/0418 345/174 |
|---|---|---|---|---|
| 2015/0193049 | A1* | 7/2015 | Peng | H03K 17/962 345/174 |
| 2015/0268790 | A1* | 9/2015 | Meyer | G06F 3/0362 345/174 |

* cited by examiner

*Primary Examiner* — Nelson Rosario
(74) *Attorney, Agent, or Firm* — Huffman Law Group, PC

(57) ABSTRACT

The method for detecting background signals of a capacitive sensing device includes obtaining several capacitance values by detecting a reference point selected from several sensing points in a frequency-hopping manner, and selectively executing a procedure for refreshing the background signals according to the capacitance values and a predetermined threshold. Accordingly, the process of signal-detection can be speeded up, and the signals having a frequency identical to a working frequency can still be identified. As a result, the accuracy of a signal-reading process can be maintained over time.

20 Claims, 8 Drawing Sheets

METHOD FOR DETECTING BACKGROUND SIGNALS OF CAPACITIVE SENSING DEVICE

CROSS-REFERENCES TO RELATED APPLICATIONS

This non-provisional application claims priority under 35 U.S.C. §119(a) on Patent Application No. 103144186 filed in Taiwan, R.O.C. on 2014 Dec. 17, the entire contents of which are hereby incorporated by reference.

BACKGROUND

Technical Field

The instant disclosure relates to a capacitive sensing technology, and more particularly, to a method for detecting background signals of a capacitive sensing device.

Related Art

For the sake of improving convenience of usage, more and more electronic devices adopt touch screens as operating interfaces. A user can touch graphics displayed on a touch screen of an electronic device for manipulating the electronic device. Comparing to button-based manipulations or other manipulation methods, touch-based manipulations are quicker, more convenient, and more ergonomic. The touch screen mainly includes a display device providing a displaying function and a sensing device providing a touching function.

These sensing devices can be classified, according to the structures and the principles applied, into several sensing types such as resistive sensing, capacitive sensing, acoustic sensing, optic sensing (e.g., infrared ray sensing), and electromagnetic sensing. Specifically, the capacitive sensing devices (i.e., sensing devices belonging to capacitive sensing type) do not require materials having good properties in terms of stress and strain, and are not easily affected by environment light. Furthermore, the manufacturing process of the capacitive sensing devices is simpler than other types of sensing devices. Therefore, most of touch screens which are recently manufactured intend to adopt the capacitive sensing device for the touch-based manipulation.

The capacitive sensing device includes sensing points which are defined by X electrodes and Y electrodes and are configured in an array form. When the user touches the capacitive sensing device, a capacitance value of at least a corresponding sensing point on which the user touches changes, and then the capacitive sensing device identifies that a touch manipulation occurs by detecting changes of the capacitance value of the sensing point. During operation, the capacitive sensing device stores background signals (i.e., capacitance values of untouched sensing points) of each sensing point as a reference value, and compares capacitance value sensed by every sensing point with the reference value so as to identify whether a certain position is touched.

Each capacitance value corresponds to each sensing point in the array. When the resolution of the display device raises (i.e., the number of the sensing points raises), the capacity of the memory utilized for storing the capacitance values accordingly requires to be enlarged, and the time consumed by updating the reference value also accordingly becomes longer. Consequently, the reference value cannot be updated frequently in a proper way and the promptness of a signal-reading process is reduced. If the reference value needs to be updated more frequently by lowering the reading frequency regarding the signal-reading process, it brings a negative effect on the sensitivity and the accuracy regarding the detection of the touch manipulation and the efficiency of the entire system declines.

SUMMARY

To address the above issue, the instant disclosure aims to provide a method for detecting background signals of a capacitive sensing device. The method includes: detecting a reference point selected from a plurality of sensing points according to a charge-float-discharge (CFD) cycle and a first number of no operation performed (NOP) commands to derive a first capacitance value; detecting the reference point according to the CFD cycle and a second number of NOP commands to derive a second capacitance value; detecting the reference point according to the CFD cycle and a third number of NOP commands to derive a third capacitance value; calculating a present difference value according to the first capacitance value, the second capacitance value, and the third capacitance value; and selectively executing a procedure for refreshing the background signals according to the present difference value and a predetermined threshold. Wherein the sensing points are configured to form an array in a manner of having a plurality of electrodes be intersected with one another. The second number is greater than the first number, and the third number is greater than the second number.

According to an embodiment of the instant disclosure, a method for detecting background signals of a capacitive sensing device includes steps of: detecting a reference point selected from a plurality of sensing points according to a CFD cycle and a first number of NOP commands to derive a first capacitance value; detecting the reference point according to the CFD cycle and a second number of NOP commands to derive a second capacitance value; detecting the reference point according to the CFD cycle and a third number of NOP commands to derive a third capacitance value; calculating an absolute difference value of the first capacitance value and the second capacitance value to derive a first difference value; calculating an absolute difference value of the second capacitance value and the third capacitance value to derive a second difference value; calculating an absolute difference value of the third capacitance value and the first capacitance value to derive a third difference value; and selectively executing a procedure for refreshing the background signals according to the first difference value, the second difference value, the third difference value, and a predetermined threshold.

According to an embodiment of the instant disclosure, a method for detecting background signals of a capacitive sensing device includes steps of: detecting a reference point selected from a plurality of sensing points according to a CFD cycle and a first number of NOP commands to derive a first capacitance value; detecting the reference point according to the CFD cycle and a second number of NOP commands to derive a second capacitance value; detecting the reference point according to the CFD cycle and a third number of NOP commands to derive a third capacitance value; calculating a mean value of the first capacitance value and the second capacitance value to derive a first measuring value; calculating a mean value of the second capacitance value and the third capacitance value to derive a second measuring value; calculating a mean value of the third capacitance value and the first capacitance value to derive a third measuring value; and selectively executing a procedure for refreshing the background signals according to the first measuring value, the second measuring value, the third measuring value, and a predetermined threshold.

According to the method for detecting the background signals of a capacitive sensing device of the instant disclosure, the timing of executing the procedure for refreshing the background signals (i.e., updating the reference value) can be determined by detecting the selected reference point in cycles. Such that the process of signal-detection can be speeded up, and the signals having a frequency identical to a working frequency can still be identified; as a result, the accuracy of a signal-reading process can be maintained over time.

These and other objectives of the instant disclosure will no doubt become obvious to those of ordinary skill in the art after reading the following detailed description of the preferred embodiment that is illustrated in the various figures and drawings.

DETAILED DESCRIPTION

Figure 1:
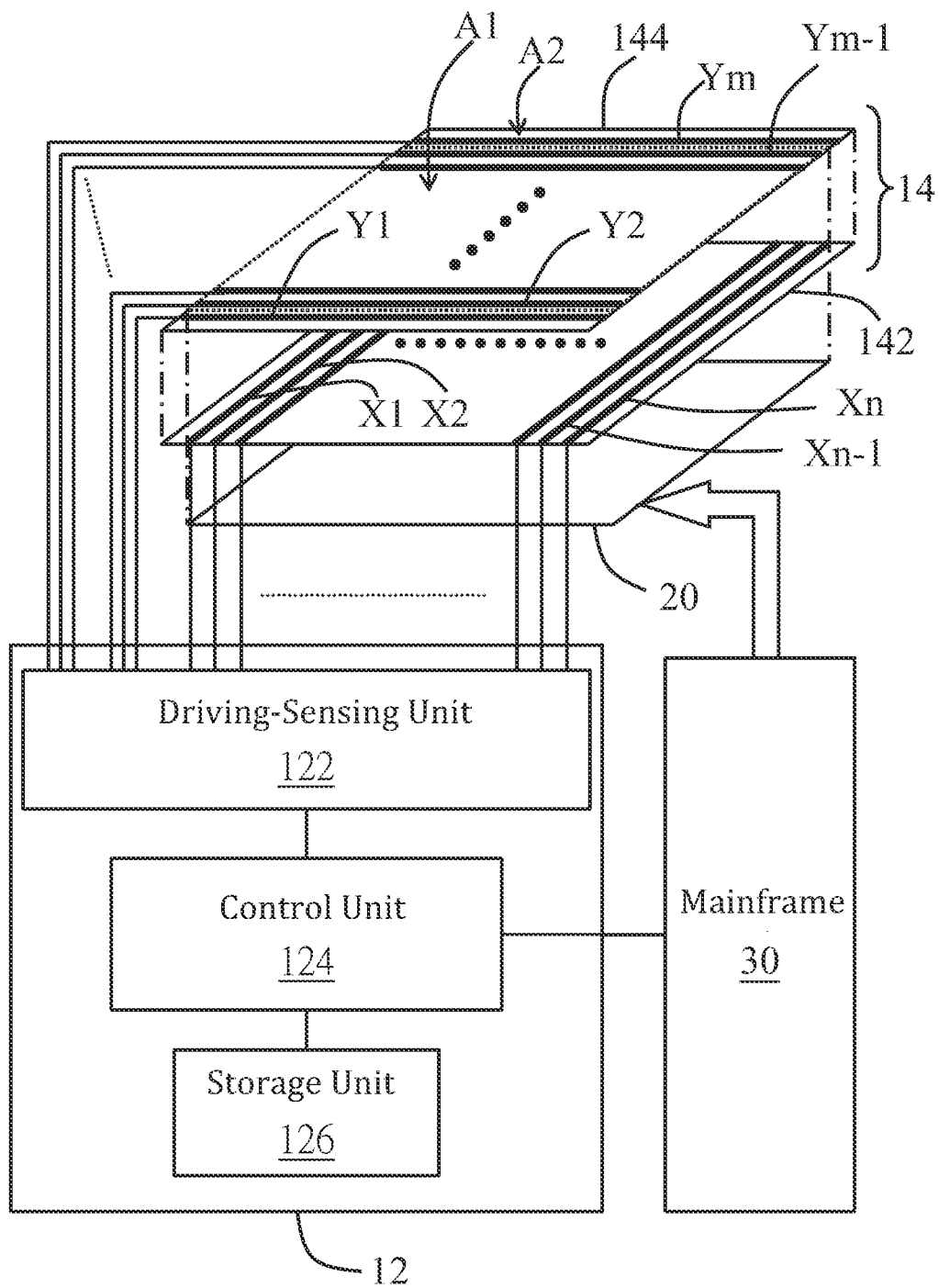
FIG. 1 illustrates a schematic block diagram of a capacitive sensing device according to an embodiment of the instant disclosure.

Referring to FIG. 1, FIG. 1 is a schematic block diagram of a capacitive sensing device according to an embodiment of the instant disclosure. A touch screen includes a capacitive sensing device, a display device 20, and a mainframe 30. The capacitive sensing device includes a controller 12 and a signal sensor 14. The signal sensor 14 is connected to the controller 12, and the signal sensor 14 is disposed on a displaying surface of the display device 20. The signal sensor 14 includes lots of electrodes (e.g., a plurality of first electrodes X1, X2-Xn−1, Xn and a plurality of second electrodes Y1, Y2-Ym−1, Ym) intersecting with one another. Wherein n and m are positive integers and n can be equal to or not equal to m.

In some embodiments, the first electrodes X1, X2-Xn−1, Xn and the second electrodes Y1, Y2-Ym−1, Ym can be respectively disposed on different planes. In other words, the signal sensor 14 includes a first sensing layer 142 and a second sensing layer 144. The second sensing layer 144 is above the first sensing layer 142, and the first sensing layer 142 is disposed on the displaying surface of the display device 20. A space between the first sensing layer 142 and the second sensing layer 144 can has, but is not limited to, an insulating layer (not shown) disposed therein.

Figure 2:
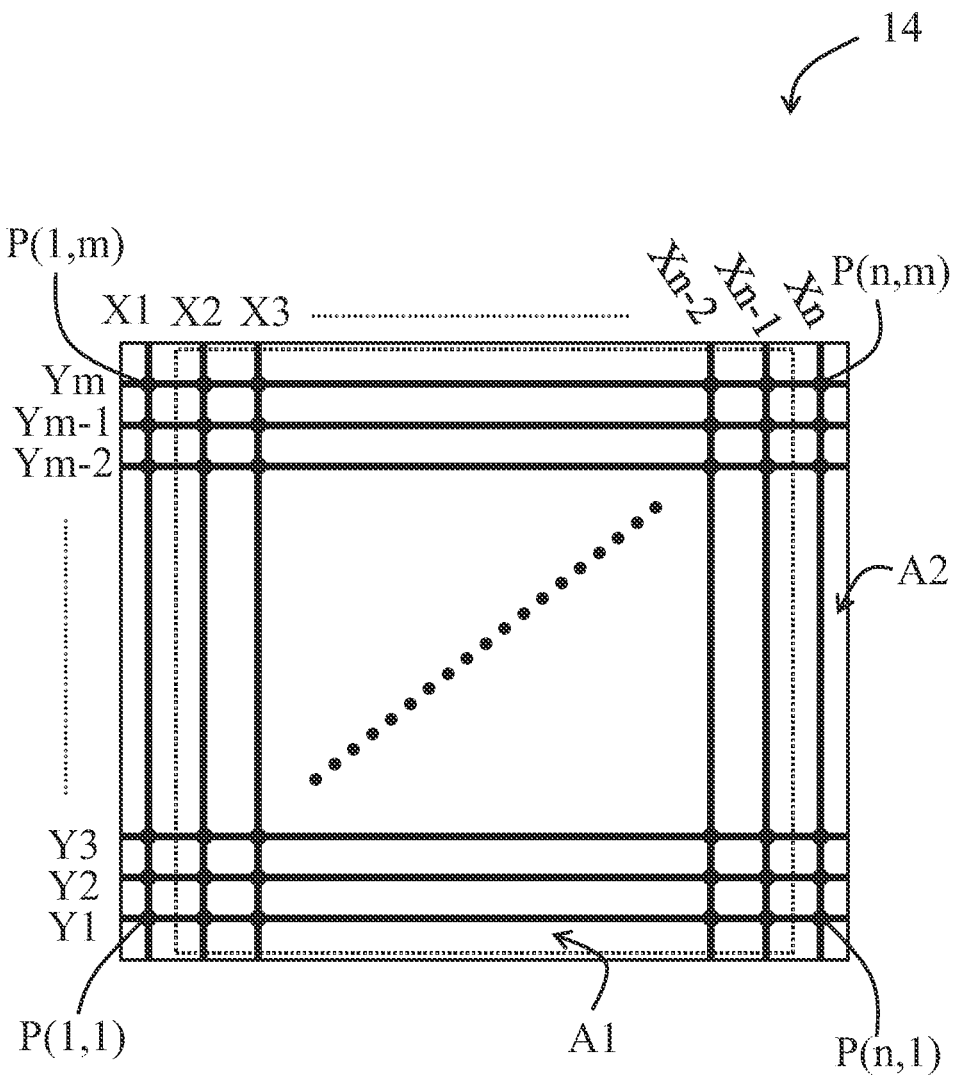
FIG. 2 illustrates a top view of a signal sensor.

The first sensing layer 142 includes lots of electrodes (i.e., the first electrodes X1, X2-Xn−1, Xn) configured in a pattern form. The first electrodes X1, X2-Xn−1, Xn are parallel with one another. Likewise, the second sensing layer 144 includes lots of electrodes (i.e., the second electrodes Y1, Y2-Ym−1, Ym) configured in a pattern form. The second electrodes Y1, Y2-Ym−1, Ym are parallel with one another. The first electrodes X1, X2-Xn−1, Xn and the second electrodes Y1, Y2-Ym−1, Ym intersect and are configured to form an array defining a plurality of sensing points P(1, 1)-P(n, m), as shown in FIG. 2. In other words, the first electrodes X1, X2-Xn−1, Xn and the second electrodes Y1, Y2-Ym−1, Ym corporately form a plane coordinate system. In the embodiment, the first electrodes X1, X2-Xn−1, Xn and the second electrodes Y1, Y2-Ym−1, Ym corporately form, but are not limited to, a Cartesian coordinate system. In other embodiment, the coordinate system can be a polar coordinate system, non rectangular coordinate system, or other kinds of plane coordinate systems. In some embodiments, a top view of the first electrodes X1, X2-Xn−1, Xn and the second electrodes Y1, Y2-Ym−1, Ym can show a honeycomb pattern, a rhombus pattern, a grid pattern, or a railing pattern.

In addition, the first electrodes X1, X2-Xn−1, Xn and the second electrodes Y1, Y2-Ym−1, Ym can be disposed on a same plane. That is, the first electrodes X1, X2-Xn−1, Xn and the second electrodes Y1, Y2-Ym−1, Ym are disposed on a single sensing layer.

Sensing layers (e.g., the first sensing layer 142 and the second sensing layer 144) can be transparent or translucent; therefore, by seeing through all of the sensing layers, contents displayed on the displaying surface by the display device 20 are visible to a user.

In other words, light rays emitted from the display device 20 can pass through all of the sensing layers to reach the eyes of the user. In some embodiments, the sensing layer can be an electric conductive film, such as, but not limited to, an indium tin oxide (ITO) film.

An area of the display device 20 for displaying contents is generally called an active area. An area on which the signal sensor 14 overlaps the active area is called a sensing area A1. Any of a touch event occurred on the sensing area A1 can be detected by the signal sensor 14. The "touch event" means a physical touch (i.e., at least a finger or at least an object directly touches the signal sensor 14) or a near touch (i.e., at least a finger or at least an object closes to but do not directly touches the signal sensor 14). In some embodiments, all of the sensing points P(1, 1)-P(n, m) of the signal sensor 14 are disposed on the active area, meaning that there is no invalid area. In some embodiments, part of the sensing points P(1, 1)-P(1, m) and P(n, 1)-P(n, m) of the signal sensor 14 are not disposed on the active area, meaning that the signal sensor 14 includes an invalid area A2 located at a periphery of the sensing area A1. Any touch event occurred on the invalid area A2 cannot be detected by the signal sensor 14.

During the operation of the touch screen, the mainframe 30 transmits contents needed to be displayed to the display device 20 of the touch screen, and the display device 20 displays a graphics including the contents. When the user, according to the graphics displayed by the display device 20, touches a specific location of the capacitive sensing device on which the display device 20 overlaps, the capacitive sensing device responds to the touch event and then transmits a location signal corresponding to the specific location to the mainframe 30 for further processing. What the further processing does depends on an executing command corresponding to the touched specific location to which an area of the graphics of the display device 20 corresponds. For example, but not limited to, the mainframe 30 responds to the location signal to execute a certain application or to display a brush stroke on the area of the display device 20 corresponding to the touched specific location. In other words, the mainframe 30 can receive the location signal from the capacitive sensing device and can be configured to initiate a certain operation based on the location signal.

The controller 12 includes a driving-sensing unit 122, a control unit 124, and a storage unit 126. The driving-sensing unit 122 includes a driving component and a sensing component. Depending on different situation, the driving component can be integrated with the sensing component in a single chip, or the driving component can be physically separated from and be electrically connected to the sensing component. The driving-sensing unit 122 is electrically connected to the first electrodes X1, X2-Xn−1, Xn and the second electrodes Y1, Y2-Ym−1, Ym. The control unit 124 is electrically connected to the driving-sensing unit 122, the storage unit 126, and the mainframe 30. The control unit 124 is for controlling the driving-sensing unit 122.

When the controller 12 detects any touch event triggered by a user, the driving-sensing unit 122 detects capacitance values of each sensing point by capacitive sensing technologies like self-capacitance detection or mutual capacitance detection. In other words, a present capacitance value of each sensing point is detected by the driving-sensing unit 122, and a change of capacitance value of each sensing point (i.e., the location signal) is obtained according to the detected present capacitance value and the corresponding background signals of each sensing point by the controller 12.

At least one sensing point located at a designated location is selected to be a reference point. In one embodiment, the selected sensing point is in the invalid area A2, or the selected sensing point is in the sensing area A1 but has less chance in occurrence of the touch event. Namely, in an embodiment, at least one sensing point in the invalid area A2 is selected to be the reference point. In another embodiment, at least one sensing point in a periphery of the array of the sensing points P(1, 1)-P(n, m) (i.e., in the first K columns or in the last K columns) is selected to be the reference point. Wherein K is a positive integer and is less than n or less than m. In one embodiment, K is a positive integer and is less than n/4 or less than m/4. In another embodiment, K is a positive integer and is less than 5. In yet another embodiment, K is 1 or 2. In further embodiment, the reference point or reference points may be one sensing point or sensing points (i*j) selected from the sensing points located at any or each corner of the array of the sensing points P(1, 1)-P(n, m). Specifically, the reference point may be one point selected from any of the corner of the array of the sensing points P(1, 1)-P(n, m). The reference points (i*j) may be an array of sensing points selected from any or each of the corner of the array of the sensing points P(1, 1)-P(n, m). Wherein i is a positive integer and is less than n, and j is a positive integer and is less than m. In one embodiment, i is a positive integer and is less than n/4, and j is a positive integer and is less than m/4. In another embodiment, i is a positive integer and is less than 5, and j is a positive integer and is less than 5. In yet another embodiment, i is 1 or 2, and j is 1 or 2.

In some embodiments, the touch screen is assembled to another device (e.g., the mainframe 30) to be a single integrated device. In the situation, the selection of a reference point may avoid a heat source of the device. In other words, a reference point may be not in an area near or above the heat source of the device.

The control unit 124 executes a signal-detection program to determine whether a procedure for refreshing the background signals (hereinafter referred as to refreshing procedure) is required to be executed.

Figure 3:
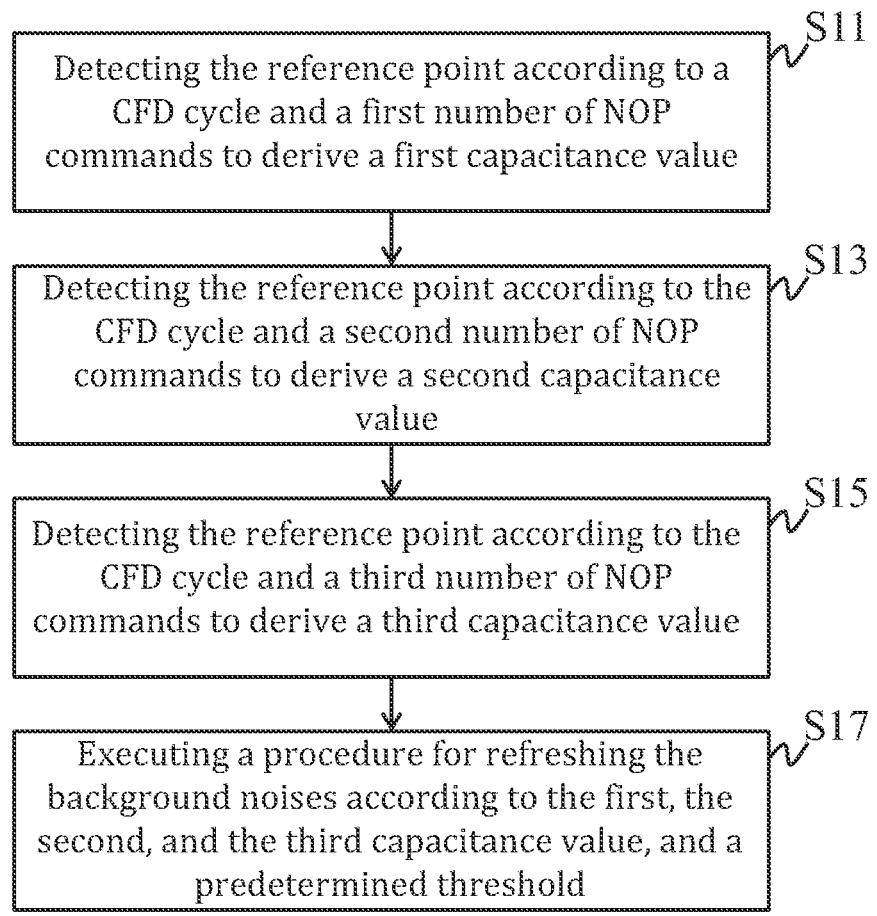
FIG. 3 illustrates a flow chart of a method for detecting capacitance values according to an embodiment of the instant disclosure.

During the operation of the refreshing procedure, referring to the step S11 of FIG. 3, the control unit 124 drives the driving-sensing unit 122 to detect the reference point according to a charge-float-discharge (CFD) cycle and a first number of no operation performed (NOP) commands to derive a first capacitance value.

And, referring to the step S13 of FIG. 3, the control unit 124 drives the driving-sensing unit 122 to detect the reference point the same as that detected by previous step according to the CFD cycle and a second number of NOP commands to derive a second capacitance value, wherein the second number is greater than the first number.

And, referring to the step S15 of FIG. 3, the control unit 124 drives the driving-sensing unit 122 to detect the reference point the same as that detected by previous step according to the CFD cycle and a third number of NOP commands to derive a third capacitance value, wherein the third number is greater than the second number.

Namely, the control unit 124 drives the driving-sensing unit 122 to detect the reference point three times in a frequency-hopping manner to obtain the first capacitance value, the second capacitance value, and the third capacitance value.

Then, referring to the step S17 of FIG. 3, the control unit 124 determines whether to execute the refreshing procedure according to the first capacitance value, the second capacitance value, the third capacitance value, and a predetermined threshold.

Figure 4:
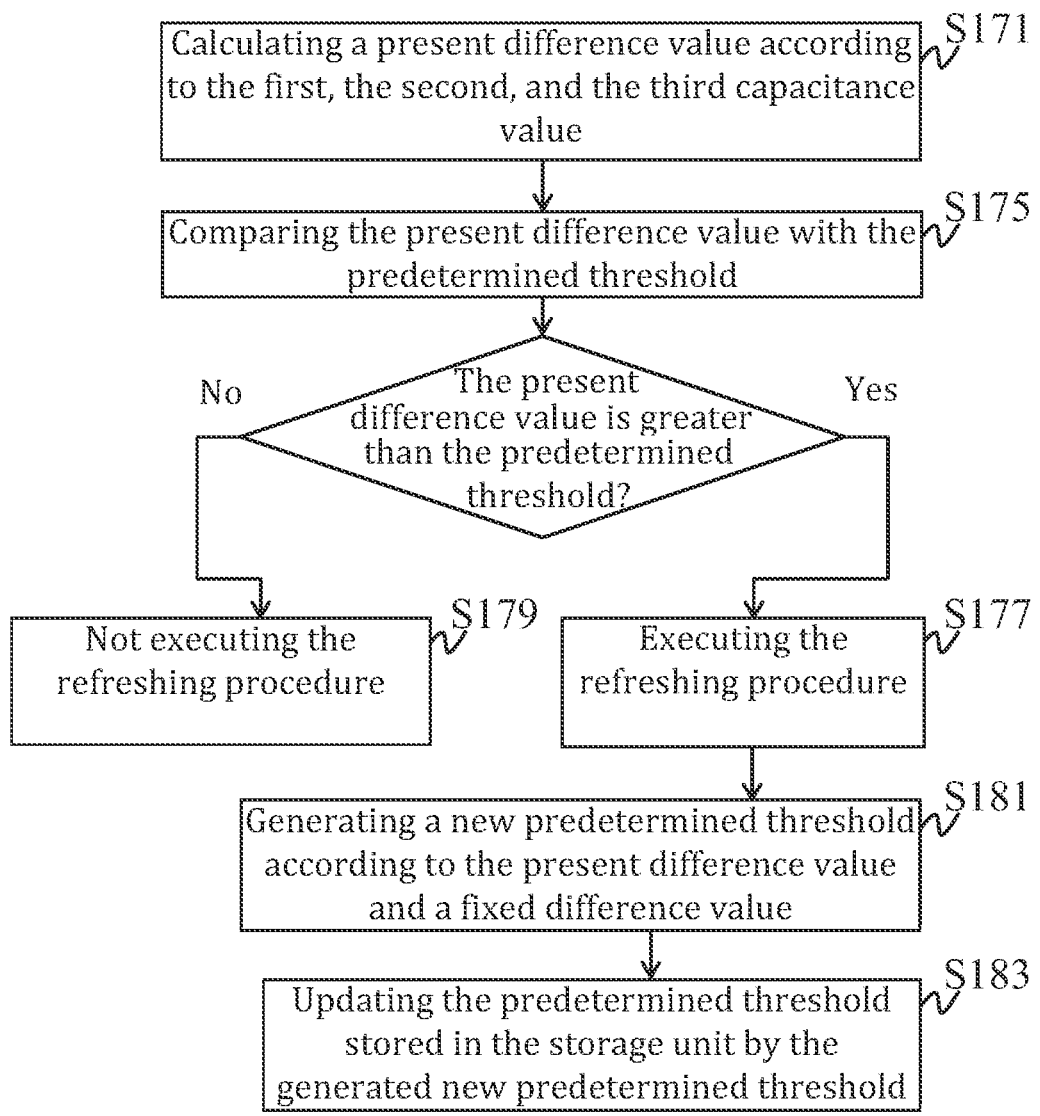
FIG. 4 illustrates a detailed flow chart according to an embodiment of the step S17.

In an embodiment of the step S17, referring to FIG. 4 and the step S171, the control unit 124 calculates and obtains a present difference value according to the first capacitance value, the second capacitance value, and the third capacitance value. Then, the control unit 124 reads the predetermined threshold from the storage unit 126. Referring to the step S175, the control unit 124 compares the present difference value with the predetermined threshold.

Referring to the step S177, when the present difference value is greater than the predetermined threshold, the control unit 124 executes the refreshing procedure to update a reference value which is used for determining whether the capacitance value of each of the sensing points P(1, 1)-P(n, m) is changed.

Referring to the step S179, when the present difference value is not greater than the predetermined threshold, the control unit 124 does not execute the refreshing procedure.

In an embodiment of the step S171, the control unit 124 calculates a mean value of the first capacitance value m1 and the second capacitance value m2 to derive a first measuring value C1 (shown in equation 1 below). The control unit 124 calculates a mean value of the second capacitance value m2 and the third capacitance value m3 to derive a second measuring value C2 (shown in equation 2 below). The control unit 124 calculates a mean value of the third capacitance value m3 and the first capacitance value m1 to derive a third measuring value C3 (shown in equation 3 below).

$$(m1+m2)/2=C1 \qquad (1)$$

$$(m2+m3)/2=C2 \qquad (2)$$

$$(m3+m1)/2=C3 \qquad (3)$$

Then, the control unit 124 calculates a sum of squared deviations of the first measuring value C1, the second measuring value C2, and the third measuring value C3 to derive the present difference value Sc (shown in equation 4 below).

$$(C1+C2+C3)/3=M$$

$$(C1-M)^2+(C2-M)^2+(C3-M)^2=Sc \qquad (4)$$

In an embodiment, the predetermined threshold corresponds to the present difference value derived by the previous signal-detection. In other words, referring to the step S181, the control unit 124 generates a new predetermined threshold according to the present difference value Sc and a fixed difference value. And, referring to the step S183, the control unit 124 updates the predetermined threshold stored in the storage unit 126 by the new predetermined threshold. The updated predetermined threshold is utilized for next comparison (i.e., for the use in the execution of the step S175 next time).

In another embodiment, the predetermined threshold can be a default value. The default value is, but is not limited to, a factory-default value. For example, the factory-default value may be set for a batch of capacitive sensing devices. The batch of sensing devices has the same size, thickness, and manufacturing parameters. The batch of sensing devices may include 10, 20, 30, or more pieces of sensing devices. However, the present difference values may be obtained by executing the refreshing procedure. Then, the predetermined threshold is calculated according to the present difference values and the fixed difference value in a statistics manner (e.g., deriving a mean value). Then, the calculated predetermined threshold is stored in each of the storage units 126 of the corresponding capacitive sensing device for further use in the execution of the signal-detection program.

Part of the present difference values obtained from previous steps of which the deviations are greater ones can be deleted first, then the predetermined threshold is calculated according to the rest of the present difference values and the fixed difference value in a statistics manner. A method of deleting the present difference values with greater deviations is, but is not limited to, deleting the one with the greatest value, deleting the one with the least value, deleting the ones respectively with the greatest value and the least value, or deleting the ones of which deviations are greater than a set value.

Figure 5:
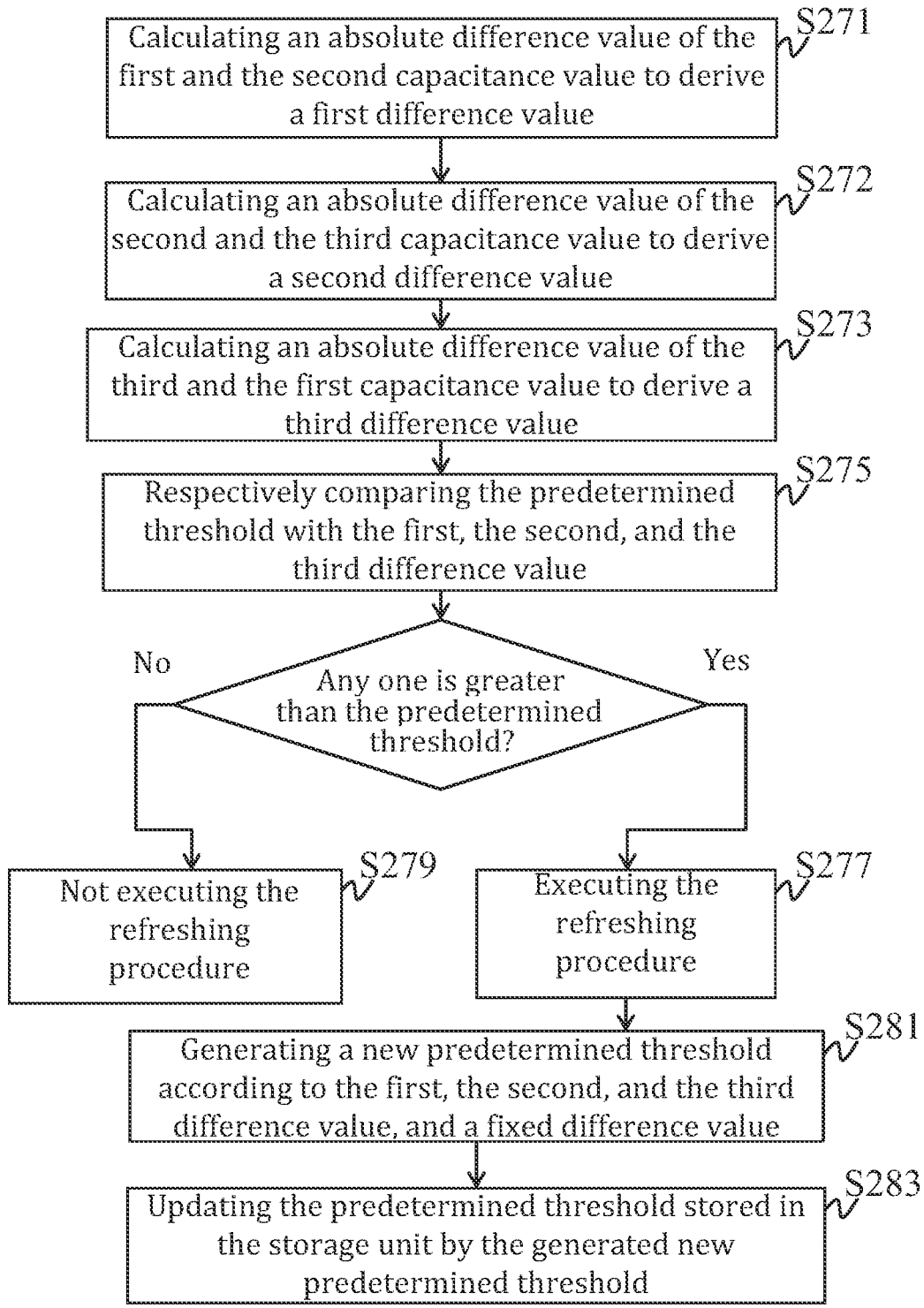
FIG. 5 illustrates a detailed flow chart according to another embodiment of the step S17.

In another embodiment of the step S17, referring to FIG. 5, the control unit 124 calculates an absolute difference value of the first capacitance value m1 and the second capacitance value m2 to derive a first difference value S1 (shown in equation 5 below and referring to the step S271). The control unit 124 calculates an absolute difference value of the second capacitance value m2 and the third capacitance value m3 to derive a second difference value S2 (shown in equation 6 below and referring to the step S272). The control unit 124 calculates an absolute difference value of the third capacitance value m3 and the first capacitance value m1 to derive a third difference value S3 (shown in equation 7 below and referring to the step S273).

$$S1=|m1-m2| \qquad (5)$$

$$S2=|m2-m3| \qquad (6)$$

$$S3=|m3-m1| \qquad (7)$$

Referring to the step S275, the control unit 124 reads the predetermined threshold from the storage unit 126, and respectively compares the predetermined threshold with the first difference value S1, the second difference value S2, and the third difference value S3.

Referring to the step S277, when any one of the first difference value S1, the second difference value S2, and the third difference value S3 is greater than the predetermined threshold, the control unit 124 executes the refreshing procedure so as to update the reference value utilized for determining whether the capacitance value of each of the sensing points P(1, 1)-P(n, m) is changed.

Referring to the step 5279, when all of the first difference value S1, the second difference value S2, and the third difference value S3 are not greater than the predetermined threshold, the control unit 124 does not execute the refreshing procedure.

In an embodiment, the predetermined threshold corresponds to the difference value derived by the previous signal-detection. In other words, referring to the step S281, the control unit 124 generates a new predetermined threshold according to the first difference value S1, the second difference value S2, the third difference value S3, and a fixed difference value. Referring to the step S283, the control unit 124 updates the predetermined threshold stored in the storage unit 126 by the new predetermined threshold. Then, the value of the updated predetermined threshold is equal to that of the new predetermined threshold. The updated predetermined threshold is utilized for next comparison (i.e., for the use in the execution of the step S275 next time). For example, the control unit 124 calculates a mean value of the first difference value S1, the second difference value S2, the third difference value S3, and has the calculated mean value plus the fixed difference value to derive a new predetermined threshold.

In another embodiment, the predetermined threshold can be a default value. The default value is, but is not limited to, a factory-default value. For example, the factory-default value may be set for a batch of capacitive sensing devices. The batch of sensing devices has the same size, thickness, and manufacturing parameters. The batch of sensing devices may include 10, 20, 30, or more pieces of sensing devices. However, the variation of the batch of the sensing devices is relative small and the present difference values may be obtained by executing the refreshing procedure. Then, the predetermined threshold is calculated according to the difference values and the fixed difference value in a statistics manner (e.g., deriving a mean value). Then, the calculated predetermined threshold is stored in each of the storage units 126 of the corresponding capacitive sensing device for the further use in the execution of the signal-detection program. Part of the difference values obtained from previous steps of which the deviations are greater ones can be deleted first, and then the predetermined threshold is calculated according to the rest of the difference values and the fixed difference value in a statistics manner.

Figure 6:
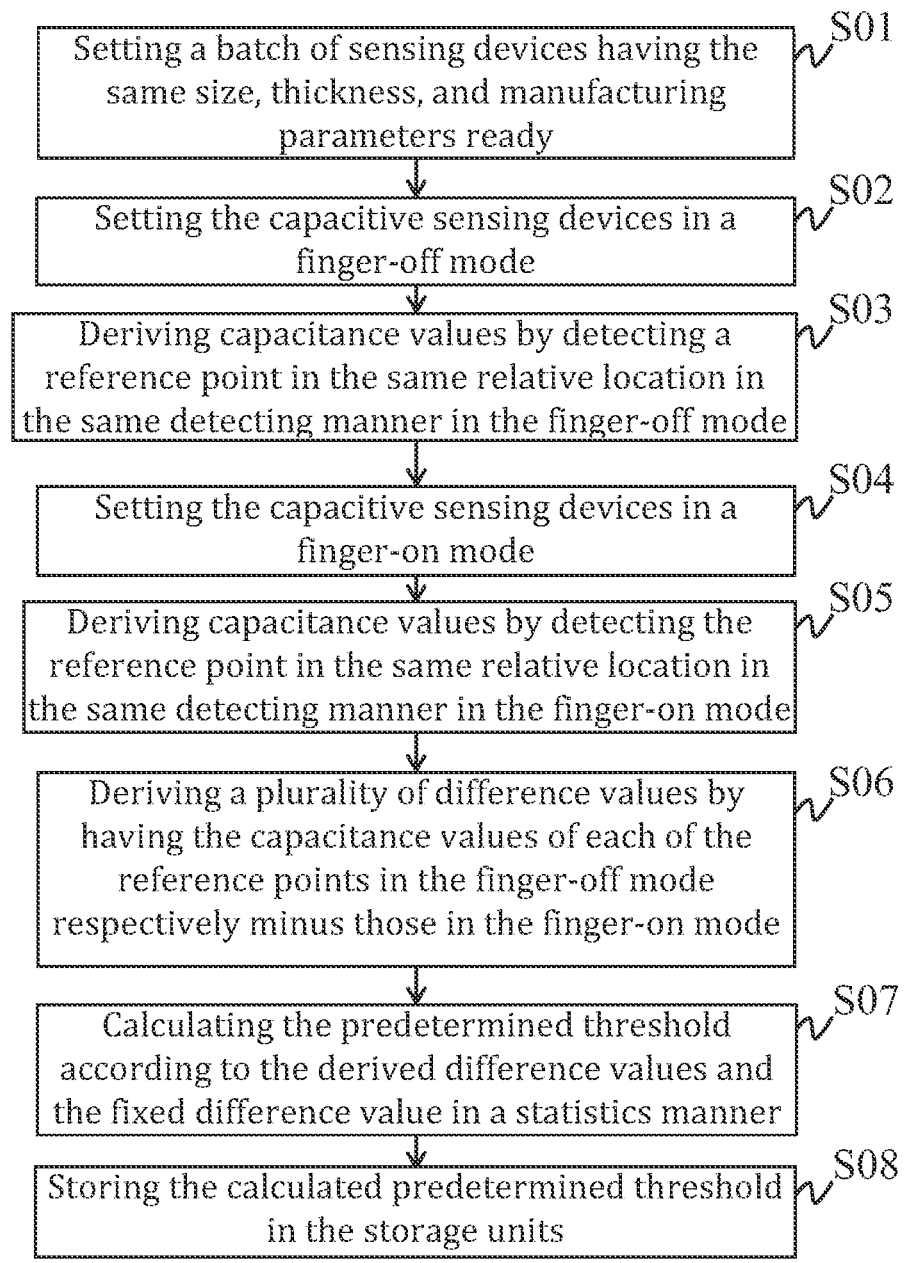
FIG. 6 illustrates a flow chart of a method for generating a default value according to an embodiment of the instant disclosure.

In yet another embodiment, the predetermined threshold corresponds to a difference value derived from a detecting value detected in a finger-off mode and a detecting value detected in a finger-on mode. For example, referring to FIG. 6 and the step S01, a batch of sensing devices having the same size, thickness, and manufacturing parameters are set ready for next step. The batch of sensing devices may include 10, 20, 30, or more pieces of sensing devices. However, the variation of the batch of the sensing devices is relative small. Referring to the step S02, each of the capacitive sensing devices are set in the finger-off mode. Referring to the step S03, capacitance values are derived by detecting at least a reference point which is in the same relative location of each capacitive sensing device in the same detecting manner in the finger-off mode. Likewise, referring to the step S04, each of the capacitive sensing devices are set in the finger-on mode. And, referring to the step S05, capacitance values are derived by detecting the reference point which is in the same relative location of each capacitive sensing device in the same detecting manner in the finger-on mode. Then, referring to the step S06, a plurality of difference values are derived by having the capacitance values of each of the reference points in the finger-off mode respectively minus those in the finger-on mode. Then, referring to the step S07, the predetermined threshold is calculated according to the derived difference values and the fixed difference value in a statistics manner (e.g., deriving a mean value). Then, referring to the step S08, the calculated predetermined threshold is stored in each of the storage units 126 with the same specification of the corresponding capacitive sensing device for the further use in the execution of the signal-detection program. In addition, when turning on, every capacitive sensing device can automatically execute the steps S01-S08 of FIG. 6 to generate the predetermined threshold and to store the generated predetermined threshold in the storage unit 126 of each capacitive sensing device in an initializing process.

Part of the difference values obtained from previous steps of which the deviations are greater ones can be deleted first, then the predetermined threshold is calculated according to the rest of the difference values and the fixed difference value in a statistics manner.

Figure 7:
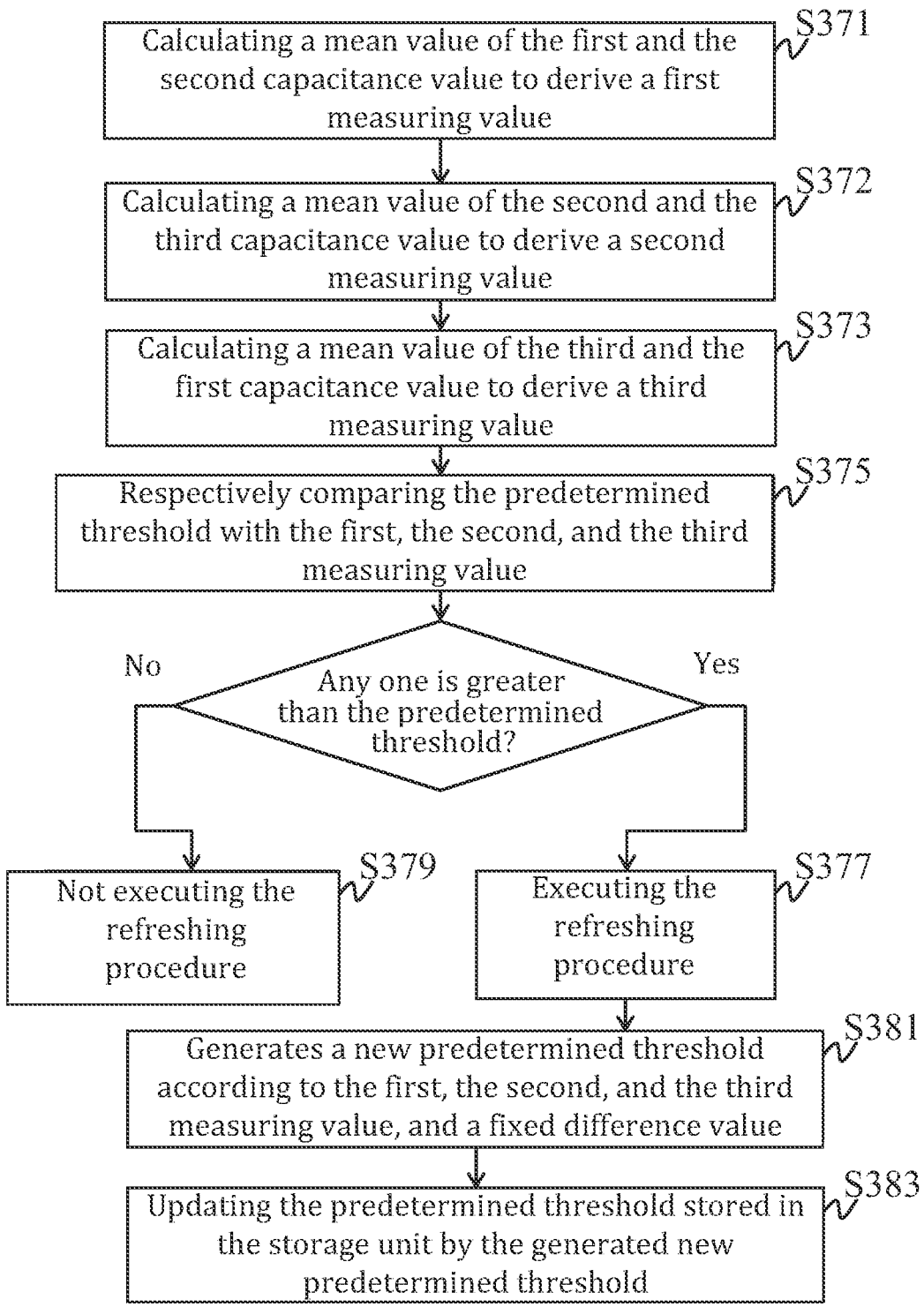
FIG. 7 illustrates a detailed flow chart according to yet another embodiment of the Step S17.

In yet another embodiment of the step S17, referring to FIG. 7, the control unit 124 calculates a mean value of the first capacitance value m1 and the second capacitance value m2 to derive a first measuring value C1 (shown in equation 1 above and referring to the step S371). The control unit 124 calculates a mean value of the second capacitance value m2 and the third capacitance value m3 to derive a second measuring value C2 (shown in equation 2 above and referring to the step S372). And the control unit 124 calculates a mean value of the third capacitance value m3 and the first capacitance value m1 to derive a third measuring value C3 (shown in equation 3 above and referring to the step S373).

Referring to the step S375, the control unit 124 reads the predetermined threshold from the storage unit 126, and respectively compares the read predetermined threshold with the first measuring value C1, the second measuring value C2, and the third measuring value C3.

Referring to the step S377, when any one of the first measuring value C1, the second measuring value C2, and the third measuring value C3 is greater than the predetermined threshold, the control unit 124 executes the refreshing procedure so as to update the reference value utilized for determining whether the capacitance value of each of the sensing points P(1, 1)-P(n, m) is changed.

Referring to the step S379, when all of the first measuring value C1, the second measuring value C2, and the third measuring value C3 are not greater than the predetermined threshold, the control unit 124 does not execute the refreshing procedure.

In an embodiment, the predetermined threshold corresponds to the measuring value derived by the previous signal-detection. In other words, referring to the step S381, the control unit 124 generates a new predetermined threshold according to the first measuring value C1, the second measuring value C2, and the third measuring value C3, and a fixed difference value. And, referring to the step S383, the control unit 124 updates the predetermined threshold stored in the storage unit 126 by the new predetermined threshold. Then, the value of the updated predetermined threshold is equal to that of the new predetermined threshold. The updated predetermined threshold is utilized for next comparison (i.e., for the use in the execution of the step S375 next time). For example, the control unit 124 calculates a mean value of the first measuring value C1, the second measuring value C2, and the third measuring value C3, and has the calculated mean value plus the fixed difference value to derive a new predetermined threshold.

In another embodiment, the predetermined threshold can be a default value. The default value is, but is not limited to, a factory-default value. For example, the factory-default value may be set for a batch of capacitive sensing devices. The batch of sensing devices has the same size, thickness, and manufacturing parameters. The batch of sensing devices may include 10, 20, 30, or more pieces of sensing devices. However, the variation of the batch of the sensing devices is relative small and the present difference values may be obtained by executing the refreshing procedure. Then, the predetermined threshold is calculated according to the measuring values and the fixed difference value in a statistics manner (e.g., deriving a mean value). Then, the calculated predetermined threshold is stored in each of the storage units 126 of the corresponding capacitive sensing device for the further use in the execution of the signal-detection program. Part of the measuring values obtained from previous steps of which the deviations are greater ones can be deleted first, then the predetermined threshold is calculated according to the rest of the measuring values and the fixed difference value in a statistics manner.

Figure 8:
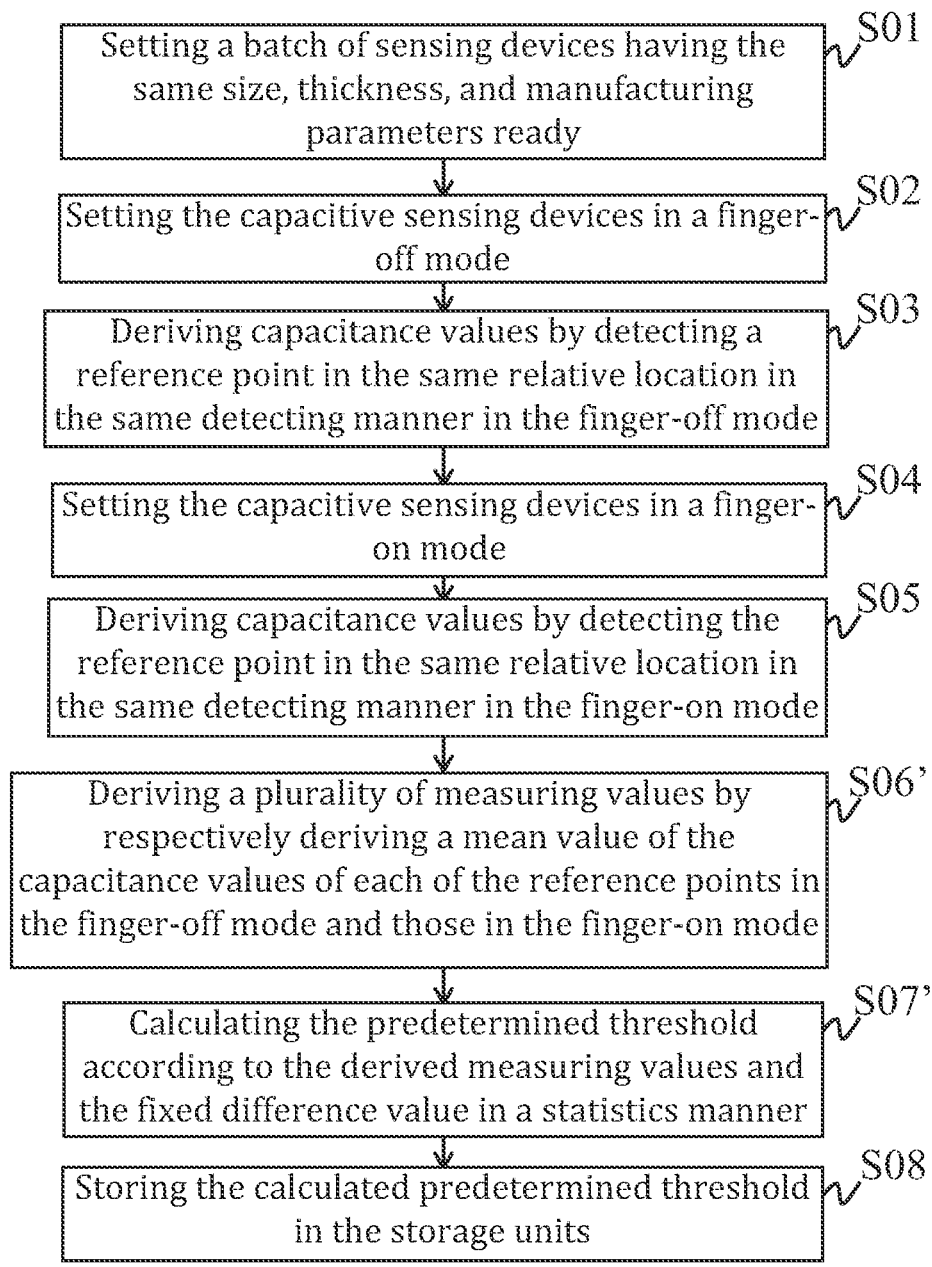
FIG. 8 illustrates a flow chart of a method for generating a default value according to another embodiment of the instant disclosure.

In yet another embodiment, the predetermined threshold corresponds to a mean value derived from a detecting value detected in the finger-off mode and a detecting value detected in the finger-on mode. For example, referring to FIG. 8 and the step S01, a number (e.g., ten, twenty, thirty, or more) of capacitive sensing devices with the same specification (e.g., the same size and the same thickness of glass) and the same manufacturing time are set ready for next step. Referring to the step S02, each of the capacitive sensing devices are set in the finger-off mode. Referring to the step S03, capacitance values are derived by detecting at least a reference point which is in the same relative location of each capacitive sensing device in the same detecting manner in the finger-off mode. Likewise, referring to the step S04, each of the capacitive sensing devices are set in the finger-on mode. And, referring to the step S05, capacitance values are derived by detecting the reference point which is in the same relative location of each capacitive sensing device in the same detecting manner in the finger-on mode. Then, referring to the step S06', a plurality of measuring values are derived by respectively deriving a mean value of the capacitance values of each of the reference points in the finger-off mode and those in the finger-on mode. Then, referring to the step S07', the predetermined threshold is calculated according to the derived measuring values and the fixed difference value in a statistics manner (e.g., deriving a mean value). Then, referring to the step S08, the calculated predetermined threshold is stored in each of the storage units 126 with the same specification of the corresponding capacitive sensing device for the further use in the execution of the signal-detection program. In addition, when turning on, every capacitive sensing device can automatically execute the steps S01-S08 of FIG. 8 to generate the predetermined threshold and to store the generated predetermined threshold in the storage unit 126 of each capacitive sensing device in an initializing process.

Part of the measuring values obtained from previous steps of which the deviations are greater ones can be deleted first, then the predetermined threshold is calculated according to the rest of the measuring values and the fixed difference value in a statistics manner.

It shall be understood that a sequence for executing the described steps can be various according to different situation. And ordinal numbers such as "first", "second", and "third" used before elements or values are not intended to imply priorities or sequences. These ordinal numbers are merely utilized for clarifying different elements or values with the same name.

The storage unit 126 can be practiced in a single or a multiple storage element. The storage element can be utilized for storing or temporally storing software, firmware, information, signals, values, or documents. And, the storage element can be, but not limited to, a volatile memory or a non-volatile memory.

According to the method for detecting the background signals of a capacitive sensing device of the instant disclosure, the timing of executing the refreshing procedure (i.e., updating the reference value) can be determined by detecting the selected reference point in cycles. Such that the process of signal-detection can be speeded up, and the signals having a frequency identical to a working frequency can still be identified; as a result, the accuracy of a signal-reading process can be maintained over time.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A method for detecting background signals of a capacitive sensing device, comprising:
   detecting a reference point selected from a plurality of sensing points according to a charge-float-discharge cycle and a first number of no operation performed commands to derive a first capacitance value, wherein the sensing points are configured to form an array in a manner of having a plurality of electrodes be intersected with one another;
   detecting the reference point according to the charge-float-discharge cycle and a second number of no operation performed commands to derive a second capacitance value, wherein the second number is greater than the first number;
   detecting the reference point according to the charge-float-discharge cycle and a third number of no operation performed commands to derive a third capacitance value, wherein the third number is greater than the second number;
   calculating a present difference value according to the first capacitance value, the second capacitance value, and the third capacitance value; and
   selectively executing a procedure for refreshing the background signals according to the present difference value and a predetermined threshold.

2. The method for detecting the background signals of a capacitive sensing device of claim 1, wherein the calculating the present difference value further comprises:
   calculating a mean value of the first capacitance value and the second capacitance value to derive a first measuring value;
   calculating a mean value of the second capacitance value and the third capacitance value to derive a second measuring value;
   calculating a mean value of the third capacitance value and the first capacitance value to derive a third measuring value; and
   calculating a sum of squared deviations of the first measuring value, the second measuring value, and the third measuring value to derive the present difference value.

3. The method for detecting the background signals of a capacitive sensing device of claim 1, wherein the reference point is located at a periphery of the array.

4. The method for detecting the background signals of a capacitive sensing device of claim 3, wherein the reference point is located at a corner of the array.

5. The method for detecting the background signals of a capacitive sensing device of claim 1, wherein the predetermined threshold is a default value.

6. The method for detecting the background signals of a capacitive sensing device of claim 1, further comprising:
   generating a new predetermined threshold according to the present difference value and a fixed difference value; and
   updating the predetermined threshold by the new predetermined threshold.

7. A method for detecting background signals of a capacitive sensing device, comprising:
   detecting a reference point selected from a plurality of sensing points according to a charge-float-discharge cycle and a first number of no operation performed commands to derive a first capacitance value, wherein the sensing points are configure to form an array in a manner of having a plurality of electrodes be intersected with one another;
   detecting the reference point according to the charge-float-discharge cycle and a second number of no operation performed commands to derive a second capacitance value, wherein the second number is greater than the first number;
   detecting the reference point according to the charge-float-discharge cycle and a third number of no operation performed commands to derive a third capacitance value, wherein the third number is greater than the second number;
   calculating an absolute difference value of the first capacitance value and the second capacitance value to derive a first difference value;
   calculating an absolute difference value of the second capacitance value and the third capacitance value to derive a second difference value;
   calculating an absolute difference value of the third capacitance value and the first capacitance value to derive a third difference value; and
   selectively executing a procedure for refreshing the background signals according to the first difference value, the second difference value, the third difference value, and a predetermined threshold.

8. The method for detecting the background signals of a capacitive sensing device of claim 7, wherein the selectively executing the procedure for refreshing the background signals further comprises:
   comparing the first difference value with the predetermined threshold;
   comparing the second difference value with the predetermined threshold;
   comparing the third difference value with the predetermined threshold; and executing the procedure for refreshing the background signals when any one of the first difference value, the second difference value, and the third difference value is greater than the predetermined threshold.

9. The method for detecting the background signals of a capacitive sensing device of claim 7, wherein the reference point is located at a periphery of the array.

10. The method for detecting the background signals of a capacitive sensing device of claim 9, wherein the reference point is located at a corner of the array.

11. The method for detecting the background signals of a capacitive sensing device of claim 7, wherein the predetermined threshold is a default value.

12. The method for detecting the background signals of a capacitive sensing device of claim 7, further comprising:
calculating a present difference value according to the first difference value, the second difference value, and the third difference value;
generating a new predetermined threshold according to the first difference value, the second difference value, the third difference value, and a fixed difference value; and
updating the predetermined threshold by the new predetermined threshold.

13. The method for detecting the background signals of a capacitive sensing device of claim 7, wherein the predetermined threshold corresponds to a difference value between a detecting value detected in a finger-off mode and a detecting value detected in a finger-on mode.

14. A method for detecting background signals of a capacitive sensing device, comprising:
detecting a reference point selected from a plurality of sensing points according to a charge-float-discharge cycle and a first number of no operation performed commands to derive a first capacitance value, wherein the sensing points are configured to form an array in a manner of having a plurality of electrodes be intersected with one another;
detecting the reference point according to the charge-float-discharge cycle and a second number of no operation performed commands to derive a second capacitance value, wherein the second number is greater than the first number;
detecting the reference point according to the charge-float-discharge cycle and a third number of no operation performed commands to derive a third capacitance value, wherein the third number is greater than the second number;
calculating a mean value of the first capacitance value and the second capacitance value to derive a first measuring value;
calculating a mean value of the second capacitance value and the third capacitance value to derive a second measuring value;
calculating a mean value of the third capacitance value and the first capacitance value to derive a third measuring value; and
selectively executing a procedure for refreshing the background signals according to the first measuring value, the second measuring value, the third measuring value, and a predetermined threshold.

15. The method for detecting the background signals of a capacitive sensing device of claim 14, wherein the selectively executing the procedure for refreshing the background signals further comprises:
comparing the first measuring value with the predetermined threshold;
comparing the second measuring value with the predetermined threshold;
comparing the third measuring value with the predetermined threshold; and
executing the procedure for refreshing the background signals when any one of the first measuring value, the second measuring value, and the third measuring value is greater than the predetermined threshold.

16. The method for detecting the background signals of a capacitive sensing device of claim 14, wherein the reference point is located at a periphery of the array.

17. The method for detecting the background signals of a capacitive sensing device of claim 16, wherein the reference point is located at a corner of the array.

18. The method for detecting the background signals of a capacitive sensing device of claim 14, wherein the predetermined threshold is a default value.

19. The method for detecting the background signals of a capacitive sensing device of claim 14, further comprising:
generating a present measuring value according to the first measuring value, the second measuring value, and the third measuring value in a statistics manner;
generating a new predetermined threshold according to the present measuring value and a fixed difference value; and
updating the predetermined threshold by the new predetermined threshold.

20. The method for detecting the background signals of a capacitive sensing device of claim 14, wherein the predetermined threshold corresponds to a mean value derived from a detecting value detected in a finger-off mode and a detecting value detected in a finger-on mode.

* * * * *